April 21, 1953 M. M. ARLIN 2,635,748
ELECTRICAL GAUGING AND SORTING APPARATUS
UTILIZING STANDING WAVES
Filed June 24, 1947 4 Sheets-Sheet 1
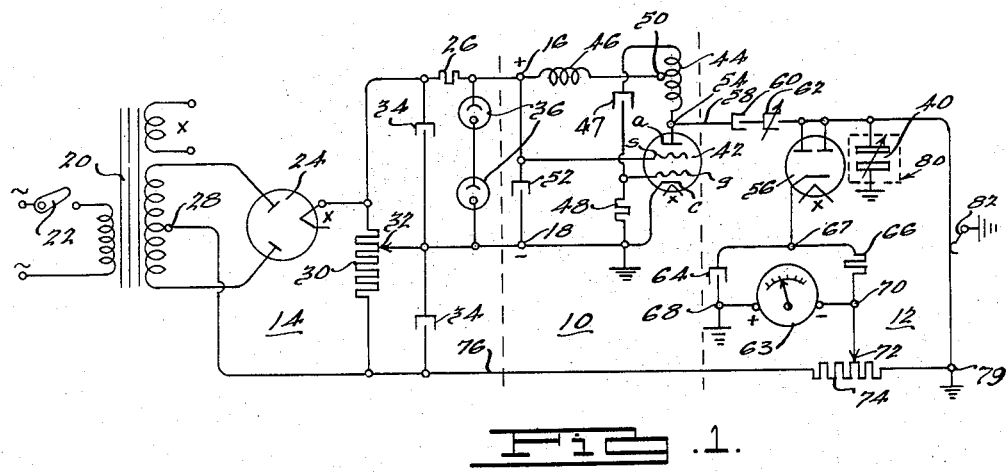
FIG. 1.
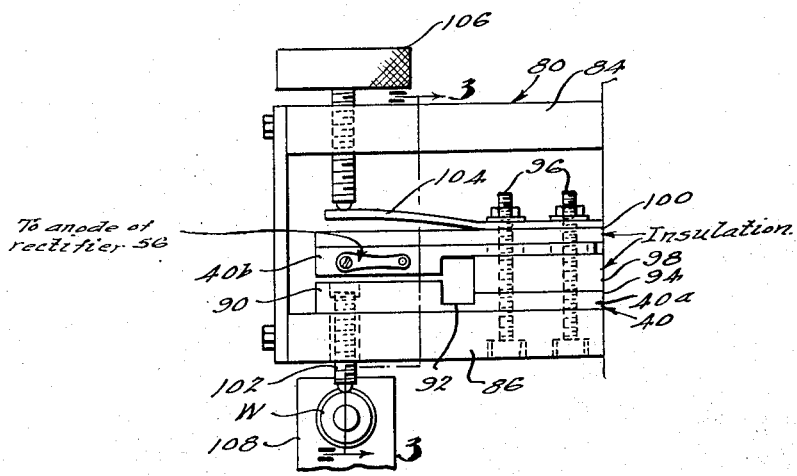
FIG. 2.
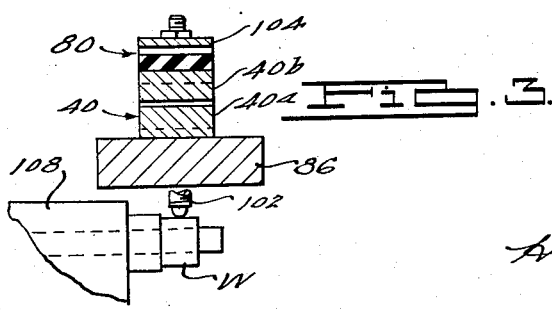
FIG. 3.
INVENTOR.
Max M. Arlin.
BY
Harness, Dickey & Pierce
ATTORNEYS.

April 21, 1953 M. M. ARLIN 2,635,748
ELECTRICAL GAUGING AND SORTING APPARATUS
UTILIZING STANDING WAVES
Filed June 24, 1947 4 Sheets-Sheet 2
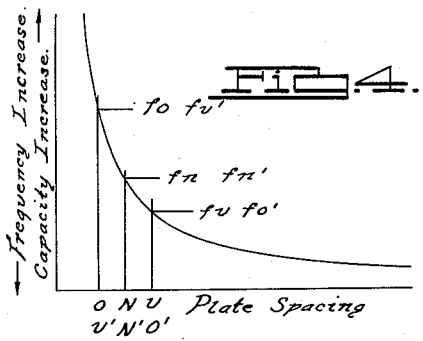
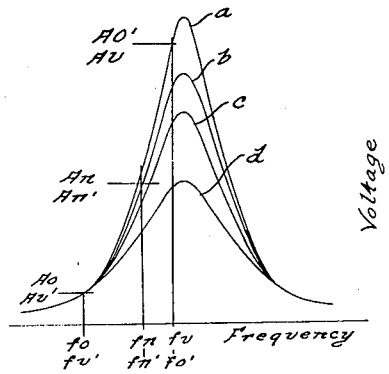
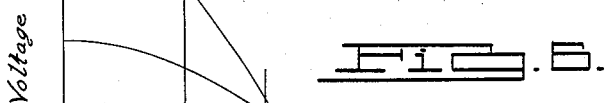
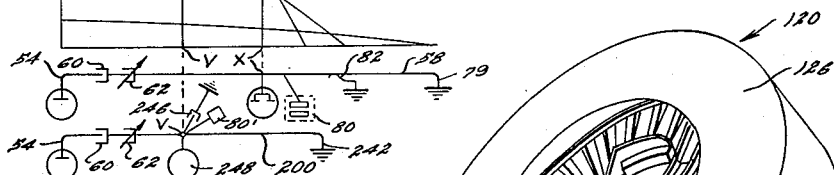
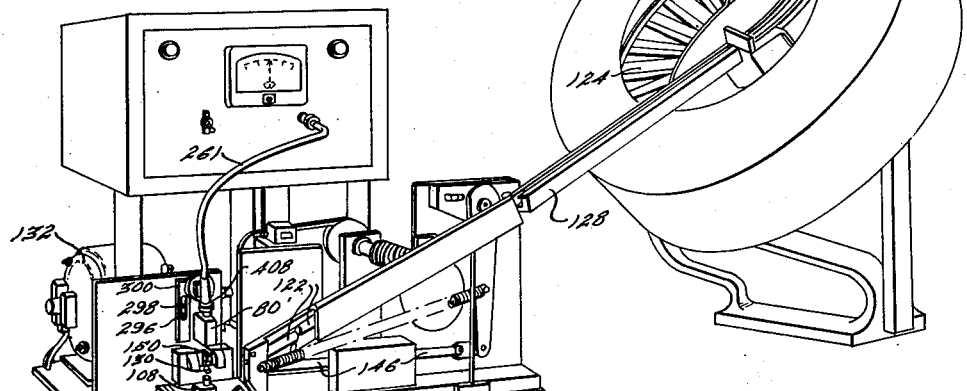
INVENTOR.
Max M. Arlin.
BY
Harness Dickey & Pierce
ATTORNEYS.

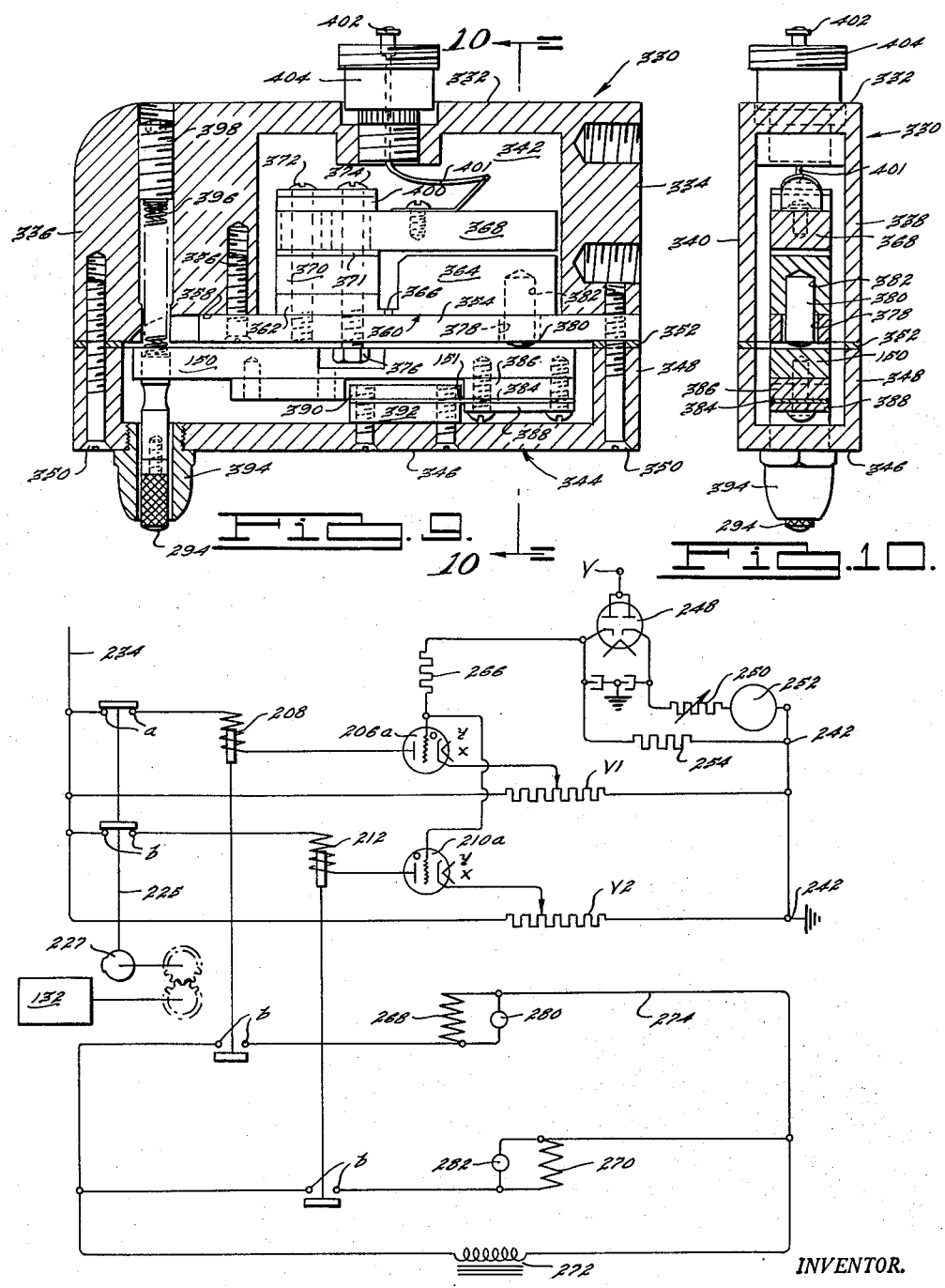
April 21, 1953  M. M. ARLIN  2,635,748
ELECTRICAL GAUGING AND SORTING APPARATUS
UTILIZING STANDING WAVES
Filed June 24, 1947  4 Sheets-Sheet 4
INVENTOR.
Max M. Arlin.
BY
Harness, Dickey & Pierce
ATTORNEYS.

Patented Apr. 21, 1953

2,635,748

UNITED STATES PATENT OFFICE 2,635,748

ELECTRICAL GAUGING AND SORTING APPARATUS UTILIZING STANDING WAVES

Max M. Arlin, Detroit, Mich.

Application June 24, 1947, Serial No. 756,591

12 Claims. (Cl. 209—82)

The present invention relates to measuring systems and more particularly to such systems wherein a measurement of a physical characteristic of a workpiece is obtained by enabling such characteristic to determine the value of an impedance included in an electrical network which also includes an electrical measuring instrument. In the specific form disclosed herein, the invention is particularly adapted for electrical gauging operations, and affords an economical and reliable unit for detecting variations, in physical dimensions, of magnitudes as low as one millionth of an inch.

This application is a continuation in part of my co-pending application Serial No. 561,020 filed October 30, 1944, for Electric Measuring System, now abandoned.

Principal objects of the present invention are to provide a system which represents patentable advance both in respect to its method and its apparatus, and which is simple in arrangement, economical of manufacture and assembly and which is reliable in operation; to provide such a system which, in a generic sense, comprises an oscillatory source, a measuring network coupled thereto, and a variable impedance element which is effective to determine the frequency of the source and to consequently determine the amplitude of pulsations in the measuring network, such network including a measuring device responsive to such amplitude; to provide an improved combination of circuit controlling elements whereby the response of the measuring device is linear with respect to linear changes in the measured characteristic of the workpiece; to provide improved constructions of variable condensers for use in systems of the above as well as other types; to provide a network responsive to the pulsations in the measuring network for selectively controlling the disposition of the measured workpiece; to provide such a segregating network which will segregate the workpieces according to the magnitude of the characteristic; to provide in such a segregating network means to hold the segregating gates in their set position until the workpiece has been diverted thereby; and to generally improve the construction and arrangement of systems of the above generally indicated character.

With the above as well as other and more detailed objects in view, which appear in the following description and in the appended claims, a preferred but illustrative embodiment of the invention is shown in the accompanying drawing; throughout the several views of which corresponding reference characters are used to designate corresponding parts and in which:

Figure 1 is a diagrammatic view of an electrical control system embodying the invention;

Fig. 2 is a view, partly in section, of a preferred variable condenser gauging head;

Fig. 3 is a view in section, taken along the line 3—3 of Figure 2;

Fig. 4 is a graphic representation of a typical condenser capacity curve;

Fig. 5 is a graphic representation of a typical resonance curve;

Fig. 6 is a graphic representation of the standing waves set up by the oscillator and schematically shows its relation to the length of the conductor having the standing wave;

Fig. 8 is a view showing the measuring and segregating apparatus shown diagrammatically in Fig. 7;

Fig. 9 is a view in substantial central vertical section with certain of the parts in elevation illustrating a modified form of gauge head;

Fig. 10 is a view taken substantially along the line 10—10 of Fig. 9 and looking in the direction of the arrows; and Fig. 11 is a fragmentary diagrammatic view of a modified form of the segregator control network for use with the system of Fig. 7.

Figure 7:
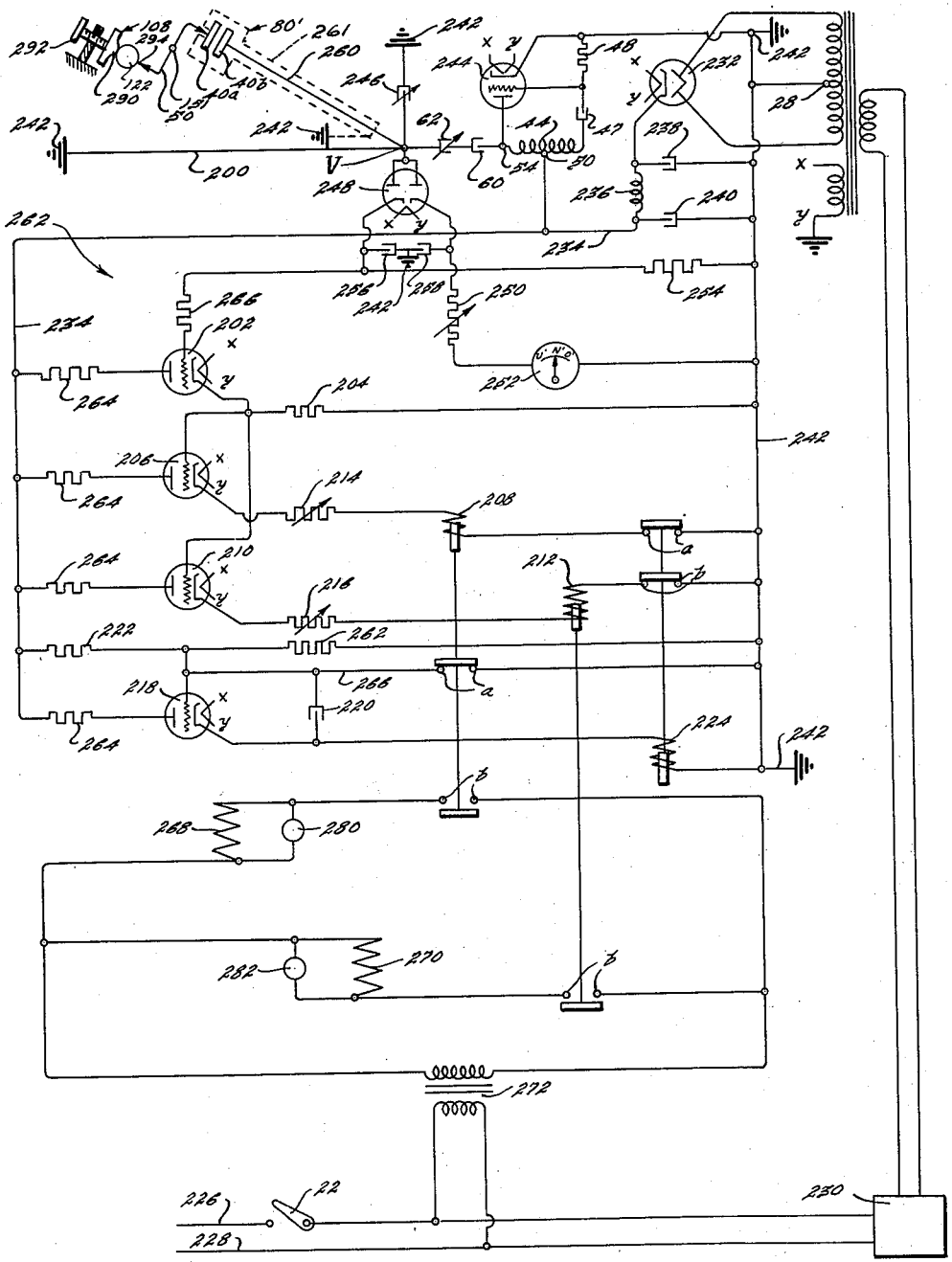
Fig. 7 is a diagrammatic view of a modified form of electrical control system including a segregating network.

Referring first to Figure 1, the system comprises generally an oscillatory network 10, a measuring network 12, and a source 14 of electrical energy.

The source 14 may be conventionally arranged to impress a substantially uniform direct current E. M. F. across the input terminals 16 and 18 of the oscillatory network 10. As shown, the source comprises a supply transformer 20, the primary winding whereof is subject to control by usual control switch 22, and the terminals of the center tapped secondary winding whereof are connected to the anodes of a usual rectifier 24 which may be, for example, of the type known to the trade as a 5Y3 rectifier. The cathode of rectifier 24 is connected through a regulating resistor 26, to terminal 16. The center tap 28 is connected to the cathode of rectifier 24 through a potentiometer resistor 30, tap 32 whereof is connected to terminal 18. A usual filter condenser 34 and a pair of usual glow tube regulating valves 36 are connected across terminals 16 and 18 in usual fashion.

From the foregoing, it will be understood that the perhaps variable voltage of transformer 20 is translated into a substantially uniform direct current E. M. F., for application to the input terminals 16 and 18 of the oscillatory network 10.

The oscillatory network 10 may be of any suitable conventional type, adapted to deliver energy at a suitable high frequency. The present system is primarily designed, as aforesaid, to produce a usable signal in response to changes in physical dimensions ranging in magnitude from a few thousandths of an inch down to one or more millionths of an inch. In order to maintain the physical dimensions of the condenser 40, associated with the hereinafter described gauge head, at practical values accordingly, it is preferred to operate the system at frequencies corresponding to wave lengths of the order of 10 meters or less. In the broader aspects of the invention, considerably lower frequencies are usable. As a specific example, in measuring physical changes of the order of a few thousandths of an inch, an oscillator frequency having a wave length of approximately three meters has been found satisfactory. In measuring smaller physical changes, of the order of one or more millionths of an inch, it has been found desirable to utilize an oscillator frequency of the just-mentioned order, and to tune the measuring circuit 12 to respond to a harmonic of the oscillator frequency.

The illustrated oscillatory network 10 includes a usual oscillator valve 42 of the screen grid type, and which may be, for example, of the type known to the trade as a 6L6 tube. The grounded cathode $c$ of valve 42 is directly connected to terminal 18. The anode $a$ of valve 42 is connected through a portion of a usual tank coil 44, and a usual radio frequency choke 46, to terminal 16. The remaining portion of tank coil 44 is coupled to the control grid $g$ of valve 42 through a condenser 47. Grid $g$ in turn is connected to the cathode through a resistor 48. It will be appreciated that terminal 50 on the tank coil 44 is at the nodal point thereof. The screen grid $s$ of valve 42 is connected to terminal 16 and is also coupled to terminal 18 through a usual filter condenser 52.

With the foregoing arrangement, it will be appreciated that the network 10 translates the input energy applied to terminals 16 and 18, into an oscillatory output, the frequency and amplitude whereof are determined by the magnitudes of the impedances in the network 10 as well as the magnitudes of the impedances included in the measuring network 12. Accordingly, the potential of the oscillator terminal 54 pulsates, above and below ground potential at the just-mentioned frequency.

The measuring network includes a usual diode rectifier 56 which may be, for example, of the type known to the trade as a 6H6 rectifier. The anodes of rectifier 56 are coupled to terminal 54 through a conductor 58, a usual coupling condenser 60, and a variable trimmer or tuning condenser 62. The cathode of rectifier 56 is connected to a usual electric meter 63, in this case a microammeter, through a condenser 64 and a resistor 66. The meter terminal 68 is grounded, and the meter terminal 70 is connected to an intermediate tap 72 on resistor 74. Resistor 74 is connected by a conductor 76, to the supply transformer terminal 28, and to the grounded terminal 79. It will be appreciated therefore that neglecting the energy supplied to meter 63 through rectifier 56, this meter is biased to the indicated polarity by the last-mentioned connections. The initial meter bias may, of course, be adjusted by adjusting the position of tap 72 along resistor 74.

One plate of condenser 40, which forms a part of the gauge head 80, shown in Figs. 2 and 3, is connected directly to the anodes of rectifier 56, and the other plate thereof is directly grounded, in this case through the frame of the gauge head 80. The anodes of rectifier 56 are also directly connected to the grounded terminal 79 and, for the reason mentioned below, an additional adjustable ground connection 82 is provided to variably determine the length of the conductor between such anodes and ground.

Referring now to the gauge head 80, the preferred and illustrated embodiment comprises stationarily supported upper and lower frame members 84 and 86. The lower condenser plate 40a, which may be formed of steel or equivalent material, comprises a thickened end portion 90, a relatively thin intermediate portion 92, and a somewhat thicker connecting portion 94. The upper plate 40b is similarly constructed. These plates are rigidly secured to the lower frame member 86 by a plurality of studs 96 which pass through the bodies thereof and which are insulated from at least one of such condenser plates. A spacer block 98 of insulating material is interposed between the right-hand end or connecting portions of the plates, and a similar piece of insulating material 100 overlies the upper plate. The lower plate 40a, which directly overlies and is electrically continuous with the frame member 86, so as to afford the above-mentioned direct ground connection, is suitably formed so as to tend to assume a slightly arched shape, which causes its left-hand end to normally rest upon the corresponding left-hand supporting portion of the frame member 86. Such tendency may be imparted to plate 40a in various ways, for example, by surface grinding the upper surface thereof, as will be understood. A gauge pin 102 is threaded into the plate portion 90 of the lower plate 40a and passes freely through an enlarged opening in the lower frame member 86.

In order to provide an adjustment of the normal spacing between the effective plate portions of plates 40a and 40b, upper plate 40b is surmounted by a resilient springlike member 104 which is connected thereto by studs 96, but is insulated therefrom. An adjusting screw 106 bears against the elevated left-hand end of spring 104. As will be understood, if screw 106 is turned down, it lowers the left-hand end of the spring 104 and applies a pressure to the upper plate member 40b which tends to lower its left-hand end portion and reduce the spacing between the opposed faces of the plate portions of the condenser plates. This adjustment determines the initial or normal capacity of the condenser 40, as will be understood.

In use, the gauge head 80 is stationarily disposed with respect to a cooperating fixed workholder 108 which serves to stationarily support the illustrative workpiece W at a predetermined elevation with respect to the gauge pin 102. The adjustment of the parts is such that with a workpiece W of desired dimensions, such workpiece, when introduced into the holder 108, is engaged by pin 102 and elevates it from its normal position by an amount slightly in excess of the maximum expected variation in workpiece sizes. This action establishes a normal capacity value for condenser 40 which corresponds to the dimensions of the master sample, as will be appreciated. It will further be appreciated that if a slightly smaller workpiece is inserted in the holder 108, gauge pin 102 is enabled to move slightly downwardly, increasing the spacing between the plates 40a, 40b, thereby decreasing the capacity of condenser 40. Conversely, large samples decrease the spacing below the normal value and correspondingly increase the effective capacity of condenser 40.

With respect to the size of the unit, the parts are shown in the drawing at substantially full scale, the length of the lower plate 86 being approximately two and one-half inches and the other elements being proportionately sized. As a further example, the normal spacing between the plates may be of the order of five-thousandths of an inch, the minimum and maximum spacings representing departures therefrom equal to the expected variations in dimensions of the workpieces which are to be gauged.

Considering now the operation of the system, it will be appreciated from previous description that the potential, with respect to ground, of the oscillator output terminal 54, pulsates at a frequency which is determined by the impedances of the oscillator and measuring networks, the amplitude of these pulsations being adjustable by adjustment of the condenser 62. It will be understood further that terminal 54 corresponds to a position of substantially maximum amplitude of what appears to be a standing wave established by these pulsations in the conductor 58. The just-mentioned standing wave is of substantially sinusoidal form, as will be understood, intermediate portions whereof, between the peak and the node, are substantially linear. Preferably, the system is adjusted so that throughout the expected operating range, the measuring circuit is subjected to voltage changes which fall within this substantially linear portion of the standing wave. Consequently, in the practice of the invention the length of conductor 58 is such that the anodes of rectifier 56 are electrically spaced from terminal 54 by an amount sufficient to bring these anodes at an intermediate point, on the standing wave, between a peak and a node thereof. This region may be in the space between terminal 54 which is, as hereinbefore set forth, a peak point, and the first or a succeeding node. More particularly, a conductor length which establishes a spacing approximately three-quarters of a quarter-wave length is preferred in many cases. In other cases, as discussed below, and particularly with systems embodying the hereinafter described improvements respecting linearity, meter locations which are nearer the peak are preferred. Similar comments apply to the connection of the upper plate of condenser 40 with respect to the terminal 54, which terminal is connected to the rectifier anodes immediately adjacent thereto. The potentials of the anode and condenser terminals thus pulsate at the source frequency and at an amplitude determined by their position between a peak and a node of the aforesaid standing wave.

It will further be appreciated that the ground connection 80—82 is spaced from the anodes by an amount sufficient to establish such ground connection in the region of a node of the standing wave, preferably the first node which follows the position of the rectifier-condenser connection.

Current flow in the measuring circuit, as a consequence of the alternating potential applied to the anode terminals, is of course rectified by rectifier 56 and elevates terminal 67 to a value which enables it to overcome the negative bias normally established by the position of tap 72. The adjustment of the circuit is such that a workpiece of desired size establishes an intermediate substantially zero reading on the meter, larger or smaller samples producing corresponding departures to one side or the other of the central position, as will be understood.

It will further be understood that variations in the capacity of condenser 40, as determined by the size of the workpieces, by virtue of its coupling to the oscillator network alter the frequency of the oscillator, thereby changing the wave length of the standing wave produced in conductor 58 and consequently the physical location of the nodes and peaks along this conductor 58. Since the oscillator network 10 always acts to maintain terminal 54 at a peak point, the node points will move closer together and toward terminal 54 with increase in frequency by virtue of the well known formula that the speed of travel of the voltage wave in meters is equal to the product of the frequency of the wave in cycles per second multiplied by the length of the wave in meters. The physical location of the anodes of rectifier 56 remain at a fixed physical location on the conductor 58. As the frequency or wave length of the standing wave impressed on conductor 58 is varied by the capacitor or condenser 40, the point on the voltage wave at which the anodes of rectifier 56 are connected will have a higher or lower amplitude voltage change as the relative positions of the physically fixed location of the connection of the anodes of rectifier 56 to the conductor 58 and the standing wave are changed, either toward or away from the peak. This amplitude change is reflected in the amplitude of the voltage applied to, and the current passed by, rectifier 56. The current passed by the rectifier 56 is measured by the microammeter 63. The microammeter 63, therefore, by its indication of the changed current flow, is responsive to the wave length of the standing wave, although it is preferably calibrated not in amperes or meters wave length, but in fractions of an inch above and below a zero reading which is obtained from a workpiece of the desired size.

It will be appreciated that the sensitivity of the measuring circuit is directly proportional to the source frequency. A three-meter wave length can conveniently handle changes in physical dimensions of the order of .0001". In the event it is desired to measure physical changes of the order of one or more millionths of an inch, it is desirable to use a wave length of one-half meter or less. Oscillators utilizing tubes of the above-described type do not in general operate well at these lower wave lengths, and consequently, in such instances utilizing the illustrated oscillator circuit, it is preferred to tune the measuring circuit so that it responds to either the first or second harmonic of the basic oscillator wave. This tuning is accomplished in the present instance by adjusting the position of the ground connection 82. Adjusting condenser 62 gives a desired amplitude adjustment.

In the original analysis of the beforementioned circuits it was believed that the variation in amplitude change of the standing wave indicated by the meter 63 was due primarily to the change in wave length of the standing wave as determined by the condenser 40. Subsequent analysis and more complete laboratory testing now indicate that a better theory of operation is that the variation in the amplitude changes, as indicated by the meter 63, are not only caused by the change in length of the standing wave but furthermore are influenced by a change in amplitude of the impressed standing wave. That there should be changes in the amplitude of the impressed standing wave after analysis seems apparent when reference is had to the usual resonating amplitude characteristic curve as is shown in Fig. 5. In alternating current circuits as the length of the transmission line supplied from an alternating current source, in this case the oscillating network 10, approaches a node point the line approaches what is known as a resonating condition and the amplitude of the impressed alternating voltage will rise substantially above the amplitude which appears under conditions away from resonance in the manner illustrated.

The capacity relationship of a condenser of the type shown and described is qualitatively shown in Fig. 4 and is in accord with the well-known inverse ratio relation of the capacity of a condenser vs. spacing of the condenser plate. Since the frequency of the oscillator network 10 will vary inversely as the change in capacity of the controlling condenser 40, the frequency of the generated voltage cycle will vary proportionally to and in the opposite direction to the capacity change.

The normal spacing of the plates 40a and 40b of the condenser 40 with a workpiece W of the desired dimension is that indicated as N in Fig. 4, and the frequency of the oscillator network 10 will be of a value indicated as $fn$. With a workpiece of a dimension which is undersized substantially the maximum amount expected, the spacing of the condenser plates will be that indicated at U and the corresponding frequency of the network will be $fu$. Likewise, an oversized workpiece of the maximum amount expected will result in a plate spacing O with the corresponding frequency $fo$ of the network 10. The changes in linear distance between the plates 40a and 40b from N to U and N to O are equal, since normally workpieces will tend to be oversize and undersize equal amounts. It will be noted, however, that the change in frequency from $fn$ to $fu$ is substantially less than that from $fn$ to $fo$.

Now referring to Fig. 5, wherein curves $a$, $b$, $c$ and $d$ represent the relationships of voltage magnitude plotted against frequency for various values of Q in the standing wave circuit, the frequency values $fu$, $fn$ and $fo$ are indicated in relation to the resonating conditions of the conductor 58 with respect to the maximum values of the standing wave impressed thereon by the network 10, the frequency $fu$ which corresponds most nearly to the resonating frequency of the conductor 58 or in which the node point thereof most closely approaches the location of the ground connection 82 is indicated as having an amplitude of $Au$ units and will of course be adjacent the high point of the resonance curve. Since the resonating diagram is drawn with equal spacing of frequency along its horizontal axis, the frequency $fn$ and $fo$ are spaced therealong in accordance with that determined by the curve of Fig. 4. The intersection of vertical lines drawn upwardly from the points $fn$ and $fo$ with the resonance curve will determine the amplitude of the standing wave impressed on the conductor 58.

Now having determined the wave length and amplitude of the standing waves, they may be drawn as shown in Fig. 6, in which the vertical distance from the base line is indicative of the amplitude of the wave at any distance along the conductor 58 of Fig. 1 and 200 of Fig. 7 to the node point as indicated by ground connection 82 or 242. If now the anodes of the rectifier 56 are connected to the point on the conductor 58 as described before, the meter 63 will read the voltage $Xo$, $Xn$, or $Xu$, depending upon the size of the workpiece inserted in the holder 108, and with proper calibration of the meter, the dimension of the workpiece may be indicated. Figure 6 also indicates diagrammatically with respect to the length of the standing wave the length of the conductors 58 and 200 to show the somewhat initial dimensions thereof. It is to be understood, however, that the presence of the condensers 40, 60, 62 and 246 will in some respects change the shape of the voltage waves due to a change in the scale of the abscissa caused by their presence. For convenience, the abscissa and ordinate scales have been made linear to better show the sine form of the voltage curves.

The circuit shown in Fig. 7 is utilized in the apparatus shown in Fig. 8 and is similar in many respects to that shown in Fig. 1, however, it embodies certain improvements and additions thereover which will be hereinafter specifically pointed out.

Referring to Fig. 8, numeral 120 represents generally a hopper for the workpieces to be gauged or measured, which in this instance may be cylindrical workpieces 122. A rotary member 124 within the hopper shell 126 is rotated by suitable means not shown and feeds the workpiece 122 into the chute 128 which feeds these workpieces into the work holder 108 of the gauge head 80'. After measurement, a solenoid operated ejector 130 pushes the measured workpiece 122 into the discharge chute 134. The workpiece slides down this chute 134 and, depending upon the condition of the gates 136 and 138, will either slide completely through the chute 134 into the undersized bin 140, be diverted by the gate 136 into the normal or acceptable bin 142 or be diverted by the gate 138 into the oversize bin 144. Immediately upon ejection of the measured workpiece, a new workpiece from the chute 128 will be positioned in the work holder 108 by a plunger 146 driven by the motor 132. The gauge head 80' is similar to the gauge head 80 except that an actuating lever 150 has been added so that an oversize workpiece instead of causing the plates 40a and 40b to be moved closer together moves them apart and, conversely, an undersize piece causes them to move closer together.

Referring to the circuit shown in Fig. 7, the entry of a workpiece 122 into the work holder 108 will position the condenser plates 40a and 40b with respect to each other and adjust the length and amplitude of the standing wave in the conductor 200 so that the voltage therealong at the point V will be proportional to the size of the workpiece 122 being measured. If the magnitude of this voltage is within the desired range indicative of a workpiece falling within the proper tolerance, the proper bias will be applied to the grid of the valve 202 to permit a predetermined current flow to be passed therethrough which, due to the potential drop across a resistor 204, will raise the bias voltage of the grid of valve 206 to permit this valve to pass sufficient current to actuate the relay 208 which controls the acceptable gate 136 and the workpiece finds its way into the acceptable bin 142. If the workpiece 122 is undersize, the voltage at point V will be insufficient to permit valve 202 to raise the potential of the grid of valve 206 sufficiently to actuate the relay 208 and the workpiece will pass completely through the chute 134 to the undersize bin 140, while a workpiece of oversize dimension will raise the potential of the grid of valve 202 sufficiently to cause a valve 210 as well as valve 206 to conduct sufficient to actuate the relay 212 to actuate the oversize gate 138 which it will be noted is anterior to the gate 136 so that it controls irrespective of the gate 136 and the workpiece ends up in the oversize bin 144.

It will at once be realized that the circuit of Fig. 7 acts instantaneously and it will take an appreciable length of time for the workpiece to pass down the chute 134 beyond the gates 136 and 138. In order to prevent a change in position of the adjusted gates 136 and/or 138 during this interval, the variable resistors 214 and 216 associated with the cathodes of the valves 206 and 210, respectively, are adjusted so that, with the minimum or leakage current flow through these valves, the relays 208 and 212 when once closed will remain closed but which current is of itself insufficient to close the relays 208 and 212 when they are in open position. A valve 218 becomes conductive at a predetermined time interval after the valve 206 actuates the relay 208, such a time being determined by a condenser 220 and the setting of the variable resistor 222 as will be described more fully hereinafter and which interval is sufficient for the workpiece to pass by the gates 136 and 138. The rendering of valve 218 conductive actuates a relay 224 which opens the circuit through the coils of the relays 208 and 212 whereby they are completely de-energized. Immediately upon movement of the relay 208 to its de-energized position, the condenser 220 is shorted out and the valve 218 rendered substantially nonconductive to de-energize relay 224 closing contacts $a$ thereof to again place the gate system in condition for reoperation by the valve 248.

More specifically, the networks illustrated in Fig. 7 comprise a supply transformer 20 having its primary winding energized from a suitable source of alternating current supply such as conductors 226 and 228 under control of the switch 22 and a voltage regulating transformer 230 which acts to smooth out the voltage fluctuations of the supply line so that the primary winding of the transformer 20 is supplied with more nearly substantial constant E. M. F. Such a transformer 230 is readily obtainable in the open market under the trade name "Sola." The main secondary winding of the transformer 20 has its end terminals connected to the anodes of a rectifier valve 232 of the type commonly known as 6X5. The rectifier valve 232 as well as valves 202, 206, 210 and 218 have filament heaters which are supplied with energy from the auxiliary secondary winding of the transformer 20 as indicated by the characters $x, y$. The cathode of the rectifier valve 232 is connected to supply B+ or positive D. C. voltage to a bus 234 through a radio frequency choke 236 having by-pass condensers 238 and 240 connected between the respective end of the choke 236 and ground bus 242. The center tap 28 of the main secondary winding of the transformer 20 is directly connected to ground 242 which is a negative D. C. or B— power supply bus. The center terminal 50 of tank coil 44 is connected to the B+ bus 234. One end terminal of the tank coil 44 is connected directly and closely to the anode of an oscillator valve 244; the grid of which is connected through a condenser 47 to the opposite end of the tank coil 44 and also through a resistor 48 to B— bus 242 which may be the metal chassis upon which the instrumentalities are mounted. The cathode of the valve 244 is connected to ground 242 whereby B— potential is supplied thereto.

The anode of valve 244 is connected through a pair of series connected condensers 60 and 62 to the conductor 200 which is of a predetermined length with its far end connected to ground 242. The conductor 200 corresponds in many respects to conductor 58 of Fig. 1 and when considered in connection with the values of the condenser 40 of the gauge head 80' and the condenser 246 is of a length equal to approximately one-quarter of the wave length of the standing wave impressed thereon by the oscillating network comprising the valve 244 and tank coil 44.

As in the system of Fig. 1, the potential of a standing wave on the conductor 200 is measured by an electric valve 248 having a pair of anodes which are connected together and to the conductor 200 at the desired location V. The valve 248 has a right-hand and a left-hand cathode, the right-hand one of which is connected through a variable resistance 250 and a microammeter 252 to ground 242. The left-hand one of the cathodes of the valve 248 is connected to ground 242 through a resistor 254 which may be variable for purposes of calibration if desired. The heater filament for the valve 248 is connected as indicated by the characters $x, y$ to the transformer 20. A pair of condensers 256, 258 are connected in series between the two cathodes of the valve 248 and the condenser common terminals are connected to ground 242.

The variable condenser 246 primarily controls the Q of the standing wave circuit and is connected to the conductor 200 adjacent the connection thereto of the anodes of the valve 248 and has its other terminal connected to ground 242. Connected at this same junction V to the line 200 is one end of the concentric center lead 260 of a shielded conductor 261, the other end of the lead 260 is connected to one plate of the condenser 40 of gauge head 80'. The other plate of the condenser 40 of gauge head 80' is connected to the shield covering of the conductor 261, which covering is connected to ground 242 at its end adjacent the connection V.

When using a wave length of 10 meters, a conductor 261 of an approximate length of two feet is satisfactory for a full scale deflection of the meter 252 with a workpiece size change of .002" with a one-to-one ratio of the lever 150. Under such a condition, the value of condenser 60 and normal value of condensers 62 and 246 is .000012 M. M. F., while the range in values of the condenser 40 is .000045 to .000095 M. M. F. The length of conductor 200 from the anode of the valve 244 to point V is 1½" including the condensers 60 and 62, while the length of the conductor 200 from the point V to the ground 242 is 22½". By experiment, it has been found that by decreasing the length of the cable 261 to 12" the sensitivity of the instrument has been increased to a point where a change in .0002" in size of the workpiece will give a full scale deflection. A further decrease in length to 6" of the cable 261 will double the sensitivity and result in a full scale change in the meter 252 with a workpiece change in size of .0001". While sensitivity apparently may be controlled by varying the length of the cable 261, it is preferred to change sensitivity by adjusting the condensers 62 and 246 and by changing the fulcrum point 151 of the lever 150, as will be more fully described in connection with the more normal means of adjusting the instrument.

The segregating network generally designated 262 comprises the electric valves 202, 206, 210 and 218, the anodes of which are connected through current limiting resistors 264 to the B+ bus 234 by which they are supplied with a positive potential with respect to ground 242. The valve 202 may be termed the undersized valve since for any of the chute gates to open, the valve 202 must conduct sufficient current to raise the potential of the valve 206 a predetermined amount. The grid of this valve 202 is connected through a resistor 266 to the left-hand cathode of the valve 248. The potential of the grid of valve 202 above ground is controlled by the voltage drop across the resistor 254. The cathode of the valve 202 is connected through the resistor 204 to ground 242 and to the grid of the valves 206 and 210 so that the potential above ground of the grids of the valves 206 and 210 will be the potential drop across the resistor 204. It will be obvious that when minimum or leakage current is being passed by the valve 202, there will be a minimum voltage drop across the resistor 204 and the grids of the valves 206 and 210 will be at their minimum potential above ground 242.

The cathode of the valve 206 is connected through the resistor 214 to one terminal of the energizing coil of relay 208, the other terminal of which is connected through normally closed contacts $a$ of the relay 224 to ground 242. Similarly, the cathode of the valve 210 is connected through the resistor 216 and the energizing winding of the relay 212 and normally closed contacts $b$ of the relay 224 to ground 242. It will be appreciated that a drain current will flow through the valves 206 and 210 and which current flowing through the resistors 214 and 216, respectively, will raise the potential of the cathode of the respective valves 206 and 210 above the potential of the ground 242. This drop, by varying the value of the resistors, may be adjusted and, for the usual type of high vacuum valve which may be used, will bring the potential of the cathode above that of the respective grid so that the grid is negatively biased with respect to the cathode to normally maintain the relays 208 and 212 unactuated.

The cathode of the valve 218 is connected to one terminal of the energizing winding of the relay 224; the other terminal of this winding being directly connected to ground 242 as shown. The grid of the valve 218 is connected through the variable resistor 222 to the B+ bus 234 which supplies the anodes of the valves 202, 206, 210 and 218. The grid of the valve 218 is also connected through the resistor 262 to ground 242 and also connected by way of a conductor 266 through the normally closed contacts $a$ of the relay 208 to ground 242. Therefore, whenever the relay 208 is de-energized, the potential of the grid of the valve 218 with respect to its cathode will be such as to maintain the valve 218 at its minimum conducting conditions which is insufficient to actuate the relay 224. As stated hereinbefore, any workpieces which are not diverted from the chute by either the acceptable gate 136 or the oversized gate 138 will of necessity be carried into the undersized bin 140.

The gate 136 is controlled by means of a solenoid 268 while the oversized gate 138 which is located along the chute 134 closer to the gauge head 80' than the gate 136, is controlled by means of the solenoid 270. One terminal of each of the solenoids 268 and 270 is connected to one end of the secondary winding of a power supply transformer 272 having its primary windings supplied with energy from the conductors 226 and 228. The other end of winding of the solenoid 268 is connected through the normally open contacts $b$ of the relay 208 to the terminal of the transformer 272. The other end of the energizing winding of the solenoid 270 is likewise connected through the normally open contacts $b$ of the relay 212 to the transformer 272. If desired, indicating lamps 280 and 282 may be connected in parallel around the energizing windings for the solenoids 268 and 270, respectively, so that a visual indication may be had as to the operation of these two solenoids and of the acceptable and oversized gates 136 and 138.

Under certain operating conditions, it may be desired to eliminate the valve 202 and to connect the left-hand cathode of the valve 248 directly to the grids of the valves 206 and 210. This is possible since the valve 202 acts as a relay.

Referring to Fig. 9 in which another form of gauge head construction is shown, the numeral 330 designates generally a housing member having a top wall 332, a front wall 334, a rear wall 336, and side walls 338 and 340 and a chambered interior 342 which opens downwardly and outwardly of the casing 330, and is closed by a second casing 344 having a wall 346 with an upwardly extending peripheral flange 348. Screws 350 secure the casing 344 against the open lower side of the casing 330 and a gasket 352 is compressed between the adjacent portions of the casing 330 and the flange 348 whereby the interior chamber 342 of the casing 330 is substantially sealed. A platelike supporting member 354 is held at one end by a screw 356 against a shoulder 358 of the end wall 336 and at the other end by being clamped intermediate the lower edge portion of the wall 334 and the top edge adjacent portion of the flange 348.

The lower condenser plate 360 seats against this supporting bar 354 and is in electrical contact therewith. The lower condenser plate 360 comprises more specifically a rigidly secured end portion 362 and a movable end portion 364 hingedly secured to the rigid portion 362 by means of an integral thin section bridging portion 366. Preferably, the lower condenser plate 360 is fabricated from a single block of metal having the cross section required for the movable portion 364 and which has a portion machined away to provide the rigid portion 362 while it has an intermediate portion thereof machined much further away leaving only the relatively thin flexible bridging portion 366. The fixed condenser plate 368 comprises generally a rectangular block of metal of the same over-all length as is the lower condenser plate 360. The portion of the upper plate 368, which is located above the fixed portion 362 of the lower condenser plate 360, is spaced therefrom by means of a block of insulating material 370 which may be fiber or other similar material. If desired, shims 371 may also be used. The block 370, the fixed portion 362, and the fixed condenser plate 368 have spaced aligned holes through which securing screws 372 and 374 extend. The screw 372, which is closest to the end wall 336, is screw threaded at its lower end portion into the support 354. The other screw 374 extends through a clearance hole in the support 354 and has at its lower end portion a nut 376 for adjusting the tension imparted by this screw. Preferably, the screw 372 is tightened to rigidly secure the rear end portion of the fixed condenser plate 368 relative to the support 354 and the nut 376 is screw threaded on the screw 374 to pivot the fixed member 368 about the screw 372 until the proper nonparallel relationship is provided between the lower face of this member 368 and the upper face of the movable portion of the lower condenser plate 360 when the lower surface of the portion 364 is in engagement with the supporting member 354. The supporting member 354 also has an aperture 378 therethrough in which a pin 380 freely extends. The upper end portion of the pin 380 is received within an aperture 382 in the lower face of the movable portion 364 of the lower condenser member 360. The lower end of this pin 380 rests against the upper surface of the lever arm 150 which is located above the wall 346 and within the cavity formed by the upwardly extending flange 348.

The fulcrum point 151 for the lever 150 is provided by a flexible strip 384 which is clamped at one end between blocks 386 and 388 carried by the lever member 150 and at its other end by blocks 390 and 392 carried by the wall 346. The feeler 294 extends downwardly through an aperture in the wall 346 and fitting 394 and is suitably secured as by a press fit with the lever member 150 for reciprocal movement. The upper end portion of the feeler 294 engages the lower surface of the lever 150 at the opposite end from that engaged by the pin 380 whereby movement thereof will rotate the lever 150 about its fulcrum 151. The wall 336 above the feeler 294 has an aperture which receives a helical coil compression spring 396 which is held under controlled compression by means of a screw threaded plug 398 whereby the lever 150 is continually held in engagement with the upper end portion of the feeler 294. The end wall 334 has spaced screw threaded apertures for reception of screws for securing the gauge head casing 330 to a gauge head supporting base 300. The lower condenser plate 360 is in electrical connection with the support 354 and the casing 330. The upper condenser plate 368 is insulated from the screws 372 and 374 by suitable means such as an insulated strip 400 and having the apertures therethrough substantially of larger diameter than that of the screws 372 and 374. The plate 368 is electrically connected by a lead 401 to the center contact 402 of a terminal 404 which is screw threaded through the upper wall 332 of the casing 330. One end of the coaxial shielded cable 261 is suitably secured to the terminal 404 as by a usual fitting to connect the housing member 330 to the shielding of the cable and the contact 402 to the lead 269 thereof.

With the arrangement of the flexible member 384 as shown in Fig. 9, the feeler 294 and the pin 380 are provided with one ratio of movement therebetween. It will be obvious that the flexible member 384 may extend in the reverse direction from the supports 390 and 392 and the supports 386 and 388 may be moved downwardly along the lever 150 so that a second or a one-to-one ratio may be provided between the feeler 294 and the pin 380. It has been found from experience that the utilization of either one of these two lever ratios in connection with the condenser plates 360 and 368 will handle substantially all ranges of measurements to be made by the gauge head. It will be obvious, of course, that other ratios on the lever 150 may be established as desired. It is to be further understood that the gauge head of Figs. 9 and 10 may be substituted for the gauge head 80 or 80'.

Figure 11 shows a modified form of segregator network in which discontinuous control type gas-filled valves 206a and 210a are used in place of the valves 206 and 210 of Fig. 7; valves 202 and 218 being omitted in this arrangement. The energizing winding for the relay 208 is connected between the B+ bus 234 and the anode of valve 206a through contacts a of a switch 225. Likewise, the energizing winding for the relay 212 is connected between the bus 234 and the anode of the valve 210a through contacts b of the switch 225. The cathodes of the valves 206a and 210a are connected to intermediate points of resistors V1 and V2 having their end terminals connected between bus 234 and ground 242 so that the cathode potential thereof will normally be maintained at a greater positive potential than that of the grids thereof, whereby the valves 206a and 210a will not conduct until the potential of the left-hand cathode of the valve 248 is raised sufficiently by the workpiece to actuate either or both gates 136 and 138. In this instance, the motor 132 mechanically actuates the switch 225 through cam 227 after the workpiece has had time to pass the gates 136 and 138 to render the valves 206a and 210a again under control of the valve 248.

It is believed that the remainder of the details of construction may best be understood by reference to the description of the operation of the system. Upon closure of the switch 22, the transformer 20 is energized supplying heating current to the filament of the valves 202, 206, 210, 218, 232, 244 and 248. After these valves have warmed up sufficiently so that they are in an operating condition, the system will function. The valve 244 will oscillate in the usual fashion since this portion of the circuit is broadly similar to the well known Hartley oscillator. The frequency of oscillation of the valve 244 is determined partially by the value of the condenser 47 and to a great extent by the values of the condenser 40 of the gauge head 80' and the condenser 60, 62 and 246. A standing wave will be set up in the conductor 200. Since the grounded end portion of conductor 200 is located substantially one quarter of a wave length from the anode of valve 244, the conductor 200 will be at resonance and the amplitude thereof will be maximum for the value of condensers 60 and 62.

In the discussion of the theory of operation of the form shown in Fig. 1, reference was made to the changing voltage which was picked up by the rectifier tube 56 at the point X. By reason of further analysis and development of the system shown in Fig. 1, it was decided that an improvement in the operation could be had if the voltage instead of being picked off at the point X was picked off at the point V, and therefore the point V of Fig. 7 has been moved along the longitudinal axis of Fig. 6 to the point generally designated V. At this time it is desired to make it clear that under certain conditions of operation it may be desired to move the point V further toward the crest of antinode point of the standing wave which occurs substantially at the anode of the valve 248. Under certain other conditions, it may be desirable to actually connect the point V to the anode of the valve 244 in which case it appears that the primary change in voltage is amplitude change.

Let us now assume that the instrumentalities of Fig. 7 are to be adjusted to read at full scale deflection .0002". The center or zero point of the scale will be the normal reading, say, for example, 1.000000". Full scale deflection to the left or to O' will be 1.000100" and full scale to the right or to U' will be 0.999900". A block of the dimension 0.999900" is inserted in the work head 108 against the anvil 290 which is positioned by means of screw adjustment 292 so that the feeler tip 294 will rest against the opposite surface of the test block. The relative spacing between the gauge head 80' and holder 108 is adjusted by bodily moving the gauge head 80' upwardly or downwardly with respect to the anvil 290 until the pointer on the meter 252 reads U'; the gauge head being movable by loosening holding screws 296, one only being shown, which extend through slots 298 in the gauge head supporting base 300 and screw threaded into a supporting plate 302 rigid with the supporting member for the anvil 290. If desired, a screw threaded adjustment between plate 302 and base 300 may be provided.

In this manner the distance between the plates 40a and 40b is adjusted to bring the frequency of the standing wave to approximately the value $fu'$ (Fig. 4) and an amplitude of $Au'$ (Fig. 5). Next a block of the normal or 1.000000 dimension is placed in the work holder 108, and the trimmer condenser 62 is adjusted until the meter reads N' or at midpoint on the meter scale. This adjusts the point AN' (Fig. 5). Since an adjustment of condenser 62 will, to some extent, change the amplitude of the standing wave at the frequency $fu'$ (Fig. 5), it will again be necessary to replace the 0.999900 block in the holder 108 and, if necessary, readjust the setting between the plate 302 and base 300 and to recheck the setting of the condenser 62 with the 1.000000 block. Now having reached an approximate adjustment for the U' to N' range of the meter or the undersize workpiece range, a block of a dimension equal to 1.000100" is placed in the holder 108 and the trimmer condenser 246 is adjusted to vary the Q of the circuit until the meter needle is pointing to the full scale reading to the right or point O', thereby adjusting the point AO'. The block 1.000000 is then again re-used and condenser 62 readjusted, if necessary, as described before, for rechecking the point AN', since a change in the value of the condenser 246, while changing the amplitude of point AO', greatly may also change the amplitude of point AN', although to a lesser degree. The 1.000100 block is again used and the condenser 246 readjusted as before. When the approximate adjustments for the N' to O' range of the meter or oversize workpiece range have been obtained, the blocks 0.999900, 1.000000, and 1.000100 are again placed in the holder 108 and readjusted as above, if necessary, until the accurate adjustment of the condensers 62 and 246 and of the base 300 with respect to the plate 302 is obtained.

It will now be apparent with the adjustments just made that the relationships shown in Fig. 6 are present when the connection of the anodes of the valve 248 are at the location V.

Since the curve as represented in Fig. 4 is of generally opposite shape to the curve of Fig. 5, the point V may be located within limits at various locations along the conductor 200 and by an adjustment, as described above, substantial linearity may be imparted to the readings of the meter 252. Such linearity makes it easier for an operator to check workpieces and reduces strain when such a gauge is utilized to measure the absolute dimension of workpieces. The relative effect of changes in the readings of the meter 252 with respect to amplitude changes of the standing wave in the conductor 200 may further be adjusted by the resistor 250. This enables the operator to further combine the curves of Figs. 4 and 5 in the interest of linearity.

To enlarge the scope of the above instrument, the relative positions of the gauge head and holder 108 can be varied in any desired manner, as by the adjusting screw 292. For example, with a normal spacing for use with workpieces of 1.000000", the holder 108 is at a fixed position with respect to the head 80'. If pieces of 2.000000" are to be measured with the same scale adjustment of the meter 252, it is merely necessary to move the anvil 290 outwardly from the gauge head an additional 1.000000" and the instrument will measure from 2.000100 to 1.999900".

Within limits, the adjusting screws 292 and 296 can be used to calibrate the meter 252 to measure various dimensions over a full scale deflection. If it is desired to operate outside of that range, such may be accomplished by changing the fulcrum point 151 to provide different movements of the condenser plate 40a with respect to dimension of the workpiece 122.

So far described, the instrumentalities of Fig. 7 merely act to give a visual indication of the size of the measured workpieces. Since in production measuring it is desirable to visually spot check workpieces and desirable to accurately check and sort completely all workpieces of a given variety, an automatic segregator is also operated by the valve 248 as follows: As the voltage at point V and the conductor 200 fluctuates, current of a similar fluctuation will flow from the point V through the left-hand anode of the valve 248 and through the resistor 254 to the ground 242. Increase and decrease of this current flow through the resistor 254 will raise and lower the potential of the left-hand cathode of the valve 248 with respect to the ground 242 and at the same time will raise and lower the bias potential on the grid of the valve 202. The change in bias on the grid of the valve 202 will regulate the current flow through this valve and through the resistor 204 to the ground 242, whereby the cathode of the valve 202 will also change in potential with respect to ground 242. The grids of the valves 206 and 210 are directly connected to the cathode of the valve 202 and therefore as the current flow through the valve 202 changes, so also will the bias on the grids of the valves 206 and 210. At potentials of the point V below a predetermined value with respect to the ground 242, the grid of the valve 202 will not be made sufficiently positive to permit sufficient flow through the valve 202 to raise the grids of either of the valves 206 or 210 to bring these valves into a conducting condition. This low voltage corresponds to all voltages below voltage VU' of Fig. 6 or any other voltage indicative of the minimum size acceptable piece as may be determined further by adjustment of the variable resistance 214.

When workpieces of a dimension which is above the minimum acceptable dimension are passed through the work holder 108, the grid of the valve 206 will be made sufficiently positive to permit enough flow of current through the valve 206 and resistor 214 to actuate the relay 208. Actuation of the relay 208 closes the contacts b thereof whereby the solenoid 268 controlling the acceptable gate 136 is energized so that the pieces going down through the chute 134 will be deflected into the acceptable bin; it being understood from the previous discussion that whenever neither of the valves 206 nor 210 is conducting sufficiently to actuate its respective relays 208 and 214, the undersize pieces merely fall down through the chute 134 into the undersize work bin 140. When now the size of the workpiece 122 in the work holder 108 is above the acceptable size, the resistance 216 is so adjusted that the potential of the grid of the valve 210 is sufficient to cause this valve 210 to conduct enough current through the relay 212 to actuate the same and close the contacts b thereof. Closure of the contacts b energizes the solenoid 270, which controls the oversize gate 138 and which thereby deflects the oversized workpiece into the oversized bin 144; it being understood from the foregoing description that the oversized gate 138 is located intermediate the acceptable gate 136 and the work holder 108 so that even though the valve 206 is conducting at the same time that the valve 210 conducts and causes its relay 208 to operate the gate 136, the workpiece is diverted by the oversized gate 138 prior to reaching the acceptable gate 136. It may now be seen that the valve 248 not only controlls a visual device which indicates the size of the workpiece 122 then in the work holder 108, but also actuates a series of relays controlling gates whereby the workpieces are segregated into the undersize, acceptable, or oversized work bin.

As stated before, the actuation of the measuring circuit is substantially instantaneous with the positioning of the gauge head 80', and therefore a sufficient time delay must be provided for the gates so that, when once set, they will not move to another position until such time as they have deflected the workpiece into the proper bin. Such delay is effected by adjusting the relays 208 and 212 so that, when once actuated, they will remain in their actuated position with the minimum leakage current flow through the valves 206 and 210 respectively. Since the relays 208 and 212 are so adjusted, means must be provided for resetting of the relays. This resetting occurs at the expiration of a predetermined time interval subsequent to measurement of the piece by the gauge head 80', which time interval is sufficient for the proper one of the gates to deflect the workpiece into the proper bin. This is accomplished by means of the valve 218.

The grid of the valve 218, it will be noted, is directly connected to the B+ bus 234 through the variable resistor 222 and is also directly connected through the resistor 262 to the B— or ground 242. The grid of the valve 218 therefore, from the above connections, will assume a potential intermediate the potential of the B+ bus 234 and the B— ground 242, which valve is dependent upon the relative values of the resistors 222 and 262. The conductor 266 by-passes the resistor 262 and is under control of the contacts a of the relay 208. With the relay 208 de-energized, the contacts a thereof are closed, completely shorting the resistor 262 and placing the grid of the valve 218 at the same potential as the ground 242; the resistor 222, is then passing sufficient current to absorb the complete voltage potential which exists between the bus 234 and the ground 242. When, however, the relay 208 is energized and the contacts a thereof are opened, the potential of the grid of the valve 218 increases in a positive direction with respect to the cathode of this valve, permitting this valve to pass sufficient current to actuate the relay 224. It will be noted, however, that a condenser 220 is connected between the grid and cathode of the valve 218 so that the relative potentials of the grid and cathode of the valve 218 are not instantly changed as soon as the contacts a of the relay 208 are opened. Since the condenser 220 takes an appreciable length of time for charging, which charging is necessary before the grid potential may be brought above that of the cathode potential of the valve 218, this charging time of condenser 220 is used to provide the time delay necessary to be sure that the gates have diverted the measured workpiece into the proper bin.

As soon as the condenser 220 has charged the predetermined amount and the valve 218 conducts to actuate the relay 224, the contacts a and b thereof open, completely breaking the circuits through the energizing windings of the relays 208 and 212 whereby these relays 208 and 212 move to their de-energized position, closing the contacts a of the relay 208 and opening the contacts b of each of the relays 208 and 212. Opening of the contacts b of the relays 208 and 212 de-energizes the solenoids 268 and 270 of the acceptable and oversized gates 136 and 138, respectively, permitting these gates to swing to their open position, thereby opening the chute 134 directly to the undersized bin. Closure of the contacts a of the relay 208 again re-establishes a short circuit about the resistor 262 and substantially instantaneously discharging the condenser 220, whereby the positive bias on the grid of the valve 218 is reduced so that the current flow therethrough is insufficient to maintain the relay 224 in an operated position. Contacts a and b thereof then close, thereby placing the relays 208 and 212 under control of their respective actuating controlling valves 206 and 210. Discharge of the condenser 220 again places it in readiness for another delay holding action of the firing of the valve 218 which controls the gates 268 and 270 as above described.

It quite often happens that an operator watching the meter 252 wishes to ascertain whether the various segregating circuits are operating correctly, and for this purpose the indicating lights 280 and 282 are provided. If the work is undersize, neither of the lights 280 nor 282 will be energized; if the work is acceptable, the light 280, in parallel with the solenoid 268, will be energized; and if the work is oversize, both the light 280 and the light 282 will be energized, indicating to the operator that the work is being placed in the oversize bin.

It will be appreciated that proportionings of the various electrical elements in the circuits may be varied within relatively wide limits, illustrative ratings being indicated in the drawing.

It will also be appreciated from the foregoing that the present invention provides an extremely simple and effective method and apparatus for measuring minute variations in the characteristics of a workpiece. In accordance with the statute, a preferred use of the invention which is for measuring the physical or lineal dimensions of a workpiece has been disclosed in detail. However, this is only one use to which the system could be placed. It is believed that the basic concept which is the use of an impedance element 40 for varying the output frequency of the oscillator circuit 10 is very much broader than the specific embodiment of a condenser having one of its plates moved by the physical dimension of a workpiece in that, generically, any impedance element could be substituted therefor which would vary the output frequency of the oscillator, such as an inductance coil connected in combination for receiving a workpiece bar which changes the impedance of the inductance coil which in turn would change the output frequency of the oscillator 10 and for which the output frequency or length and/or amplitude of the standing wave in the conductor 58 would be measured by a microammeter 63. Other similar arrangements could be made in connection with hardness changes which are usually tested by the amount the surface of a piece will be depressed under a predetermined force per unit area. It will further be understood that various modifications in the form, number and arrangement of parts may be made without departing from the spirit and scope of the invention.

What is claimed is:

1. In an electrical measuring system for determining a characteristic of a workpiece, the combination of an oscillatory source having output terminals, a measuring network coupled to said terminals and of an electrical length such that a reflected wave is produced therein to provide a standing wave in said measuring network, a measuring instrument connected in said measuring network at a fixed location and responsive to the amplitude of pulsations in said measuring network at a predetermined point, said measuring network being tuned to the neighborhood of resonance to the frequency of said source, an impedance element variably controllable by said characteristic, and means coupling said element to said system so that changes in the value thereof alter the position of said standing wave in said measuring network relative to said predetermined point and thereby vary the amplitude of the pulsations applied to said measuring instrument.

2. The system of claim 1 wherein said impedance means variably determines the frequency of said source.

3. The system of claim 1 wherein said impedance element is coupled to the source by a conductor of such a length that the electrical characteristics of said impedance element and said conductor are substantially those of a conductor having a length equal to a multiple of a quarter-wave length of said source.

4. In an electrical measuring system for measuring the size of a workpiece, network means including an electric valve for generating an oscillating voltage, a network connected to said first-named network and operative to receive the voltage wave therefrom, said last-named network being of such electrical characteristics relative to the frequency of the oscillating voltage impressed thereon that reflected voltage waves are set up in said last-named network to provide a standing voltage wave, capacitance means responsive to the size of the workpiece for changing the frequency of said oscillating voltage within the range which will continue to produce reflected voltage waves in said last-named network, and means responsive to the resulting wave for indicating the size of the workpiece.

5. An electric segregating system comprising an electrical network, means for impressing a standing voltage wave in said network, means responsive to the magnitude of a characteristic of a workpiece for determining the length of said wave, an electric valve having an anode and a cathode, means connecting said anode to said network whereby it is responsive to changes in amplitude of said voltage wave, a resistance element connected between said cathode and the nodal potential of said voltage wave whereby the potential of said cathode is proportional to the magnitude of said voltage wave at the point of connection of said anode to said network, a pair of control valves each having a pair of main electrodes and a control electrode, each said pair of valves being operable to pass current between its said main electrodes in response to the bias of said control electrode relative to one of its said main electrodes, circuit means for biasing said control electrodes proportionally to the change in potential of said cathode, electrical control apparatus individual to each of said pair of valves, means adjusting the ratio of cathode voltage to control electrode voltage for each of said control electrodes whereby one of said pair of valves acts to actuate its respective control apparatus at a lesser value of said cathode voltage than the value of said cathode voltage for the other of said pair of valves to actuate its respective control apparatus whereby one of said control apparatus is actuated in response to a workpiece having a larger magnitude of said characteristic and whereby the other of said control apparatus is actuated in response to a workpiece having a lesser magnitude of said characteristic, and segregating apparatus controlled by said control apparatus for segregating said workpiece in accordance with the magnitudes of said characteristic.

6. In an electrical network for determining the characteristics of a workpiece, an electrical network for generating an oscillating potential at a frequency not less than ten million cycles per second and including an electric valve having an anode and a cathode, an electrical network having one end connected to said anode and of an electrical length not less than one-quarter of the length of the electrical wave produced by said generating network, a variable impedance element having a pair of terminals, means connecting one of said terminals to an intermediate point in said second named network, means connecting the other end of said conductor to said cathode, and potential measuring means connected to a first point in said second named network and to said cathode for measuring the potential therebetween.

7. In an electrical network for determining the characteristic of a workpiece, an electric valve having an anode and a cathode and a grid, said grid being arranged to continuously control the conductivity between said anode and said cathode in accordance with a bias potential appearing between said grid and said cathode, a pair of terminals adapted to be supplied with a source of electrical potential, a first electrical circuit connected between said anode and said cathode including inductance and capacitance tuned to resonate at a frequency of not less than 10 million cycles per second, a second electrical circuit connecting one of said terminals through at least a portion of said inductance to said anode and connecting a second of said terminals to said cathode, a third electric circuit connected between said grid and said cathode and including means in said first circuit responsive to current flow between said anode and said cathode for supplying a potential between said grid and said cathode which is 180° out of phase with the potential appearing between said anode and said cathode, electrical conductor means having a first end portion connected to said anode, said conductor means having an electrical length such that its other end portion is electrically spaced from said one end portion an electrical distance not less than one-quarter of the length of the output wave of said valve whereby said conductor means is provided with a node point in which the voltage thereof with respect to said cathode is zero, a variable impedance having a pair of terminals, means connecting one of said terminals to said conductor, means connecting the other of said pair of terminals to said cathode, and means connected between said conductor and said cathode to measure the voltage between said cathode and the point of connection of said last-named means to said conductor.

8. In an electrical measuring system for determining the magnitude of a characteristic of a workpiece, means for generating an oscillatory electric wave, means providing a circuit having the characteristics of an electrical conductor of a length not less than one-quarter of the length of said generated wave whereby a standing wave will be produced in said second named means, means operable in accordance with the magnitude of the workpiece characteristic for varying a characteristic of said generated wave, and means responsive to the changed characteristic of said wave for determining the magnitude of the workpiece characteristic.

9. In an electrical measuring system for determining the magnitude of a characteristic of a workpiece, means for generating an oscillatory electric wave, means providing a circuit having the characteristics of an electrical conductor of a length not less than one-quarter of the length of said generated wave whereby a standing wave will be produced in said second named means, means operable in accordance with the magnitude of the workpiece characteristic for varying the wave length of said generated wave, and means connected to said network at a fixed physical location and operable to measure the potential at said fixed location.

10. In an electrical measuring system for determining the magnitude of a characteristic of a workpiece, means for generating an oscillatory electric wave, a network connected to said means for receiving said wave and having substantially the electrical characteristics of a conductor of a length not less than one-quarter of the length of said wave, said generating means being sensitive to the impedance of said conductor, a pair of plates forming a condenser, means for moving one of said plates with respect to the other of said plates in accordance with changes in magnitude of said characteristic, one of the plates of said condenser being connected to said conductor and the other of said plates being connected to said first named means, said condenser being of such capacity as to bring the frequency of said wave to the maximum desired frequency when said plates are spaced apart, said condenser acting to lower the frequency of said wave as said plates are moved by said moving means into a closer relative position, and means responsive to the change in amplitude of said wave at a fixed point in said conductor for determining the magnitude of said characteristic.

11. The combination of claim 10 in which the employed portion of the characteristic curve of said condenser and the employed portion of the resonant voltage curve are substantially complemental to one another whereby a substantially linear change in amplitude results from linear change in spacing of said plates.

12. The combination of claim 11 in which means is provided to adjust the magnitude of the energy transmitted by the generating means in said first named network and for adjusting the Q of the generating means and of said first named network whereby said supplied energy and said Q may be controlled to further render said amplitude change linear with respect to relative movement of said plates.

MAX M. ARLIN.

References Cited in the file of this patent

UNITED STATES PATENTS

| Number | Name | Date |
|---|---|---|
| 1,824,746 | Allen | Sept. 22, 1931 |
| 1,884,229 | Rawls | Oct. 25, 1932 |
| 1,895,242 | Cowan | Jan. 24, 1933 |
| 2,137,787 | Snow | Nov. 22, 1938 |
| 2,146,442 | Price | Feb. 7, 1939 |
| 2,210,970 | Bonell | Aug. 13, 1940 |
| 2,222,221 | Burford | Nov. 19, 1940 |
| 2,312,357 | Odquist et al. | Mar. 2, 1943 |
| 2,337,759 | Loughlin | Dec. 28, 1943 |
| 2,358,433 | Wolfner | Sept. 19, 1944 |
| 2,363,577 | Dexter, Jr. | Nov. 28, 1944 |
| 2,369,070 | Nielsen | Feb. 6, 1945 |
| 2,399,582 | Stevens | Apr. 30, 1946 |
| 2,429,891 | Neff | Oct. 28, 1947 |